Jan. 17, 1967  A. L. PETRI ETAL  3,298,375
CIGAR MAKING MACHINE
Original Filed March 13, 1959  10 Sheets-Sheet 3
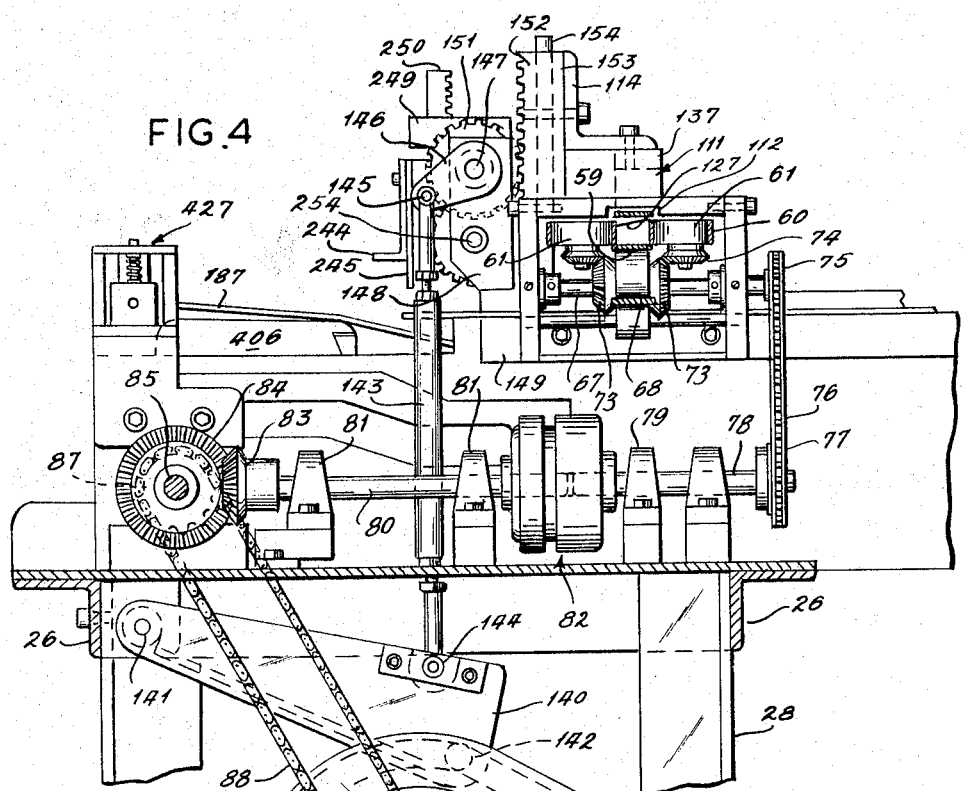
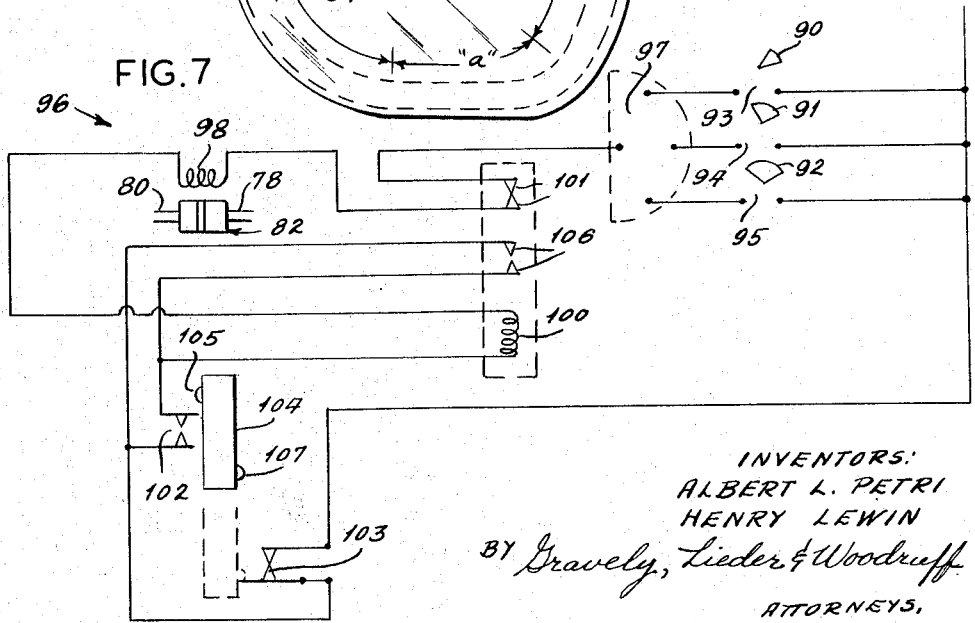
INVENTORS:
ALBERT L. PETRI
HENRY LEWIN
BY Gravely, Lieder & Woodruff
ATTORNEYS.

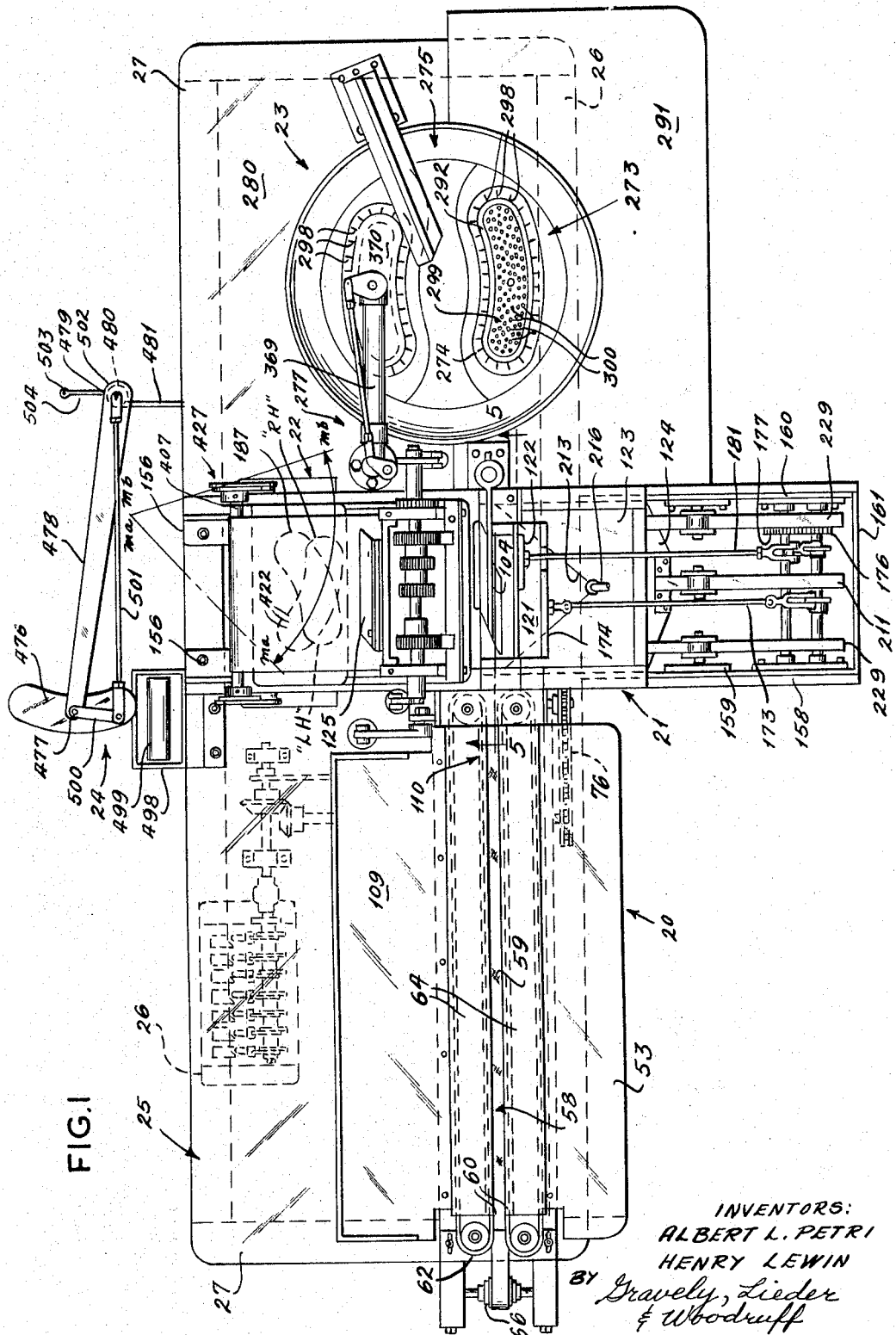

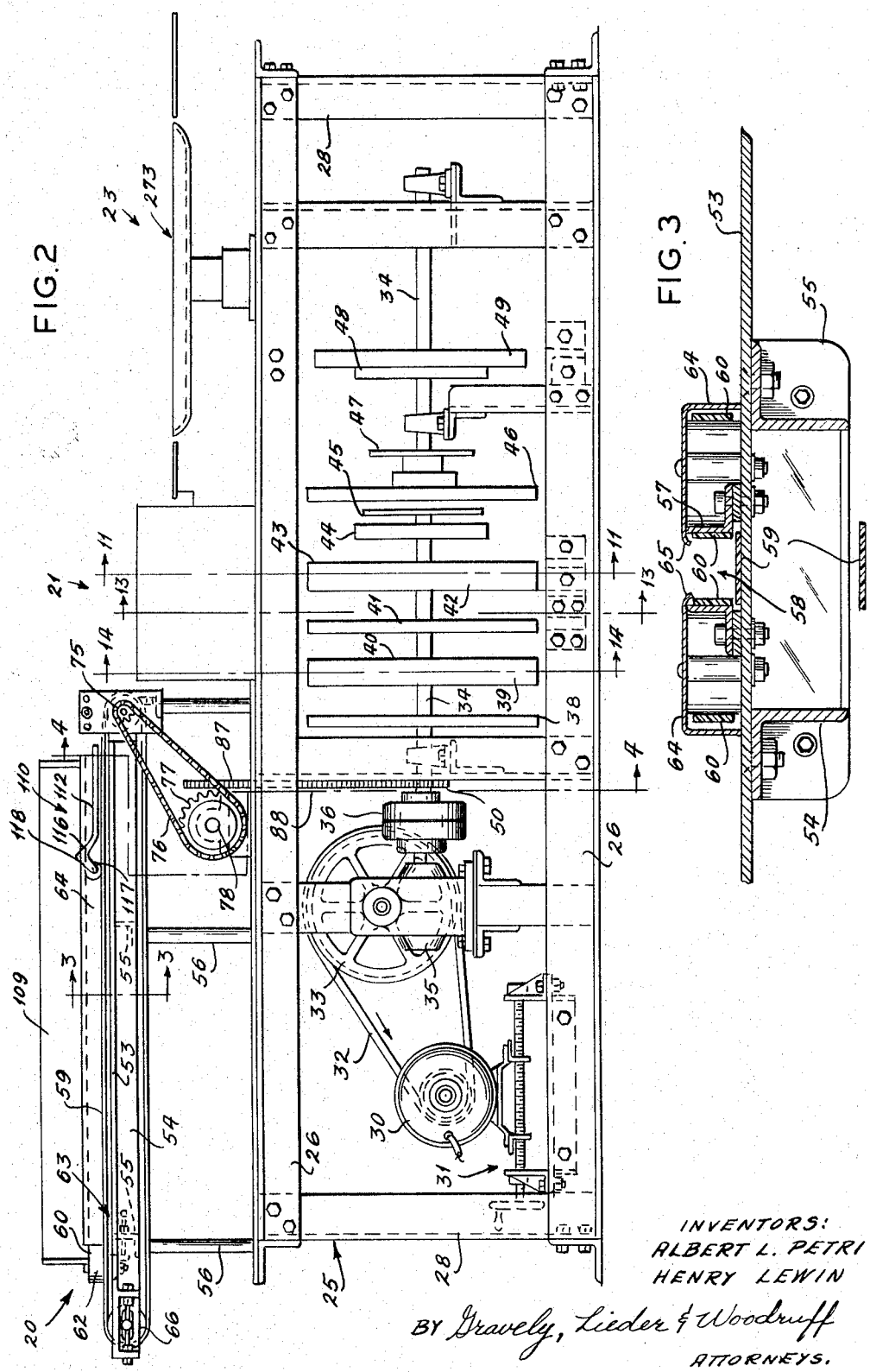

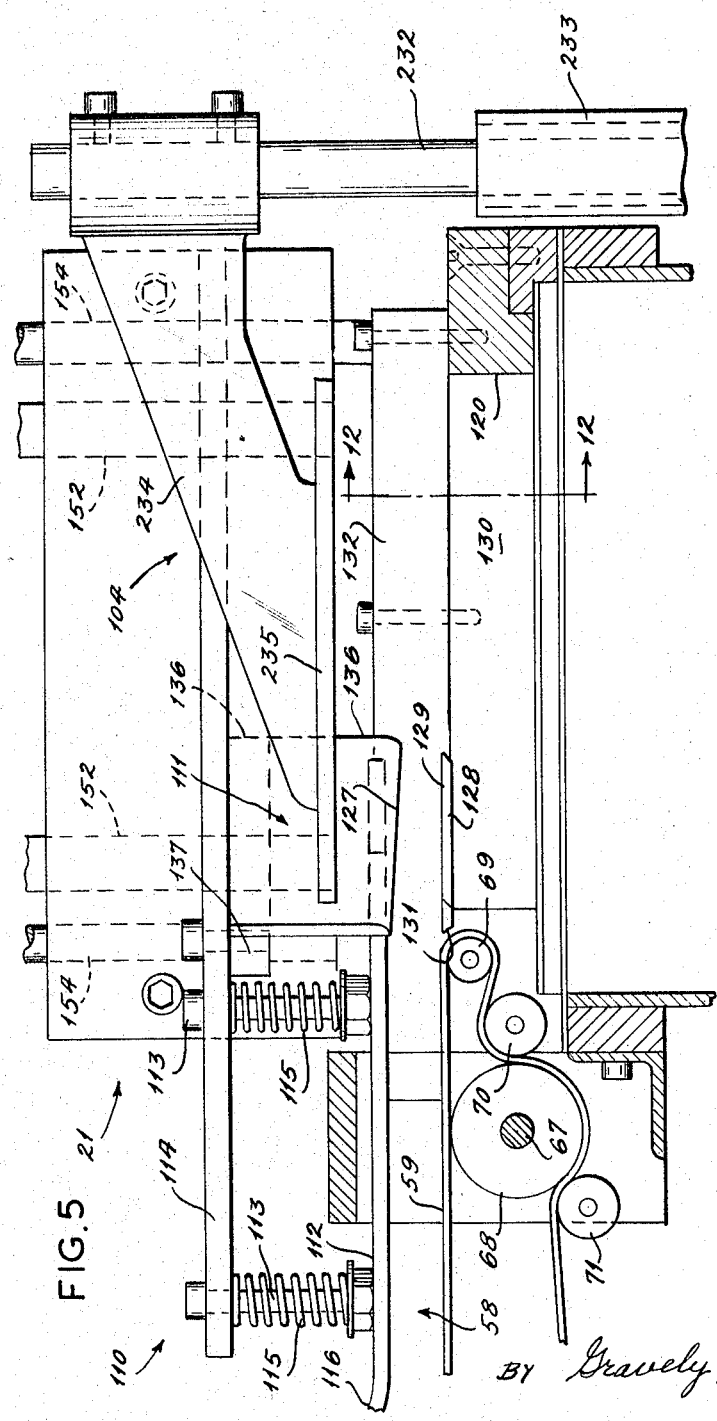
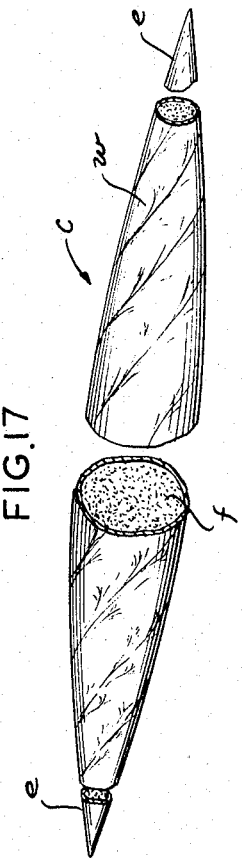

Jan. 17, 1967   A. L. PETRI ETAL   3,298,375
CIGAR MAKING MACHINE
Original Filed March 13, 1959   10 Sheets-Sheet 5
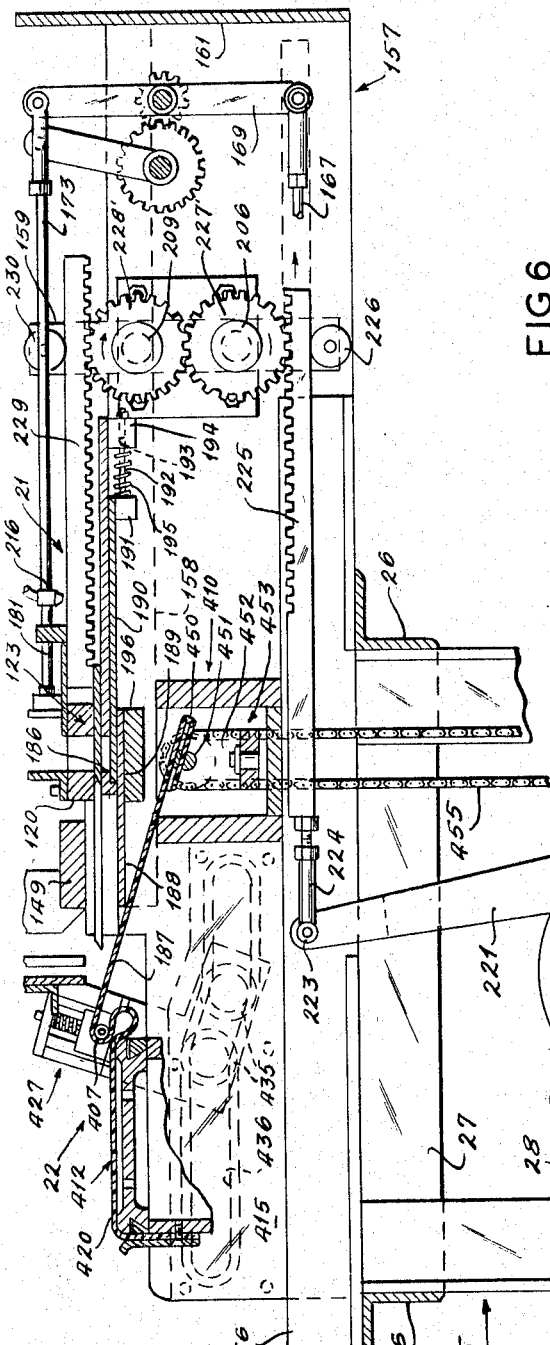
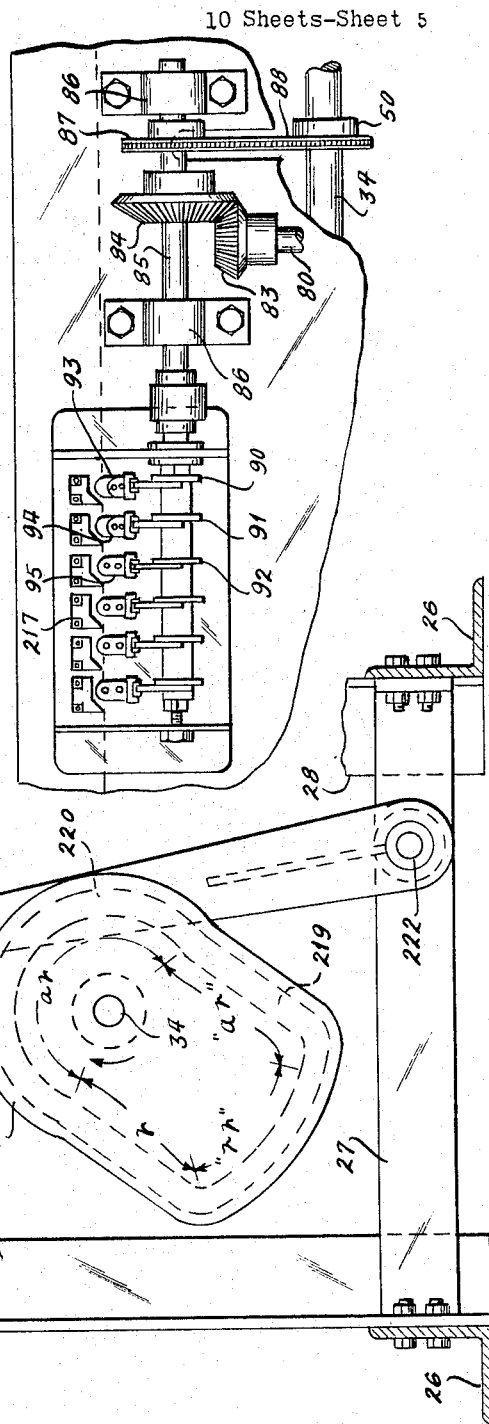
INVENTORS:
ALBERT L. PETRI
HENRY LEWIN
BY Gravely, Lieder & Woodruff
ATTORNEYS.

Jan. 17, 1967   A. L. PETRI ETAL   3,298,375
CIGAR MAKING MACHINE
Original Filed March 13, 1959   10 Sheets-Sheet 6
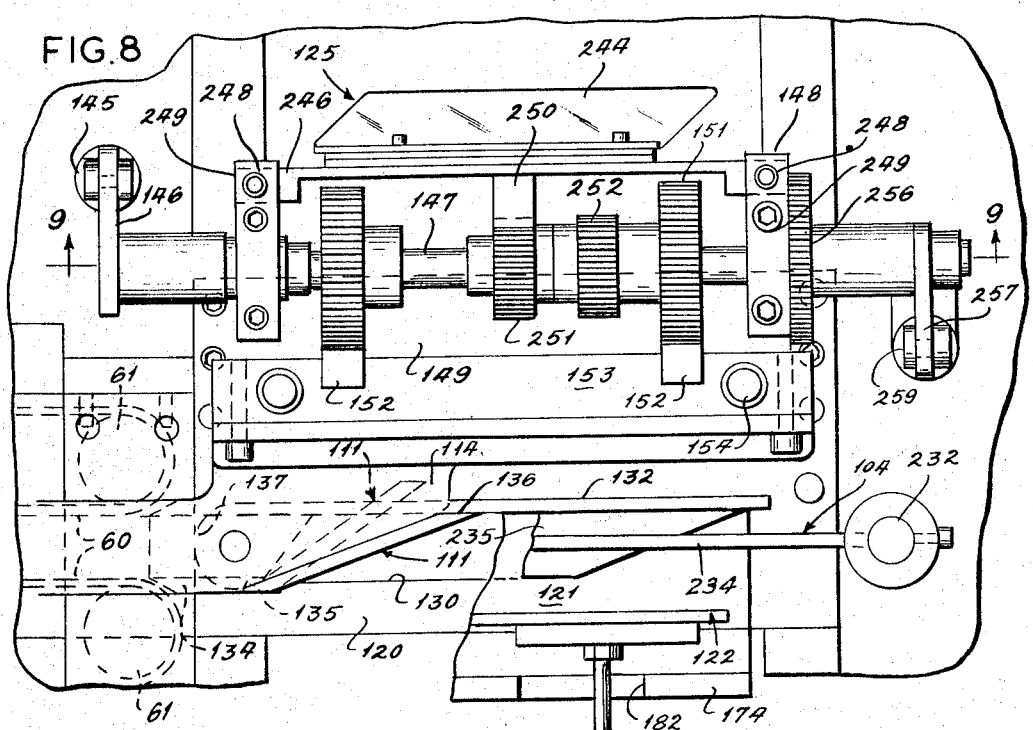
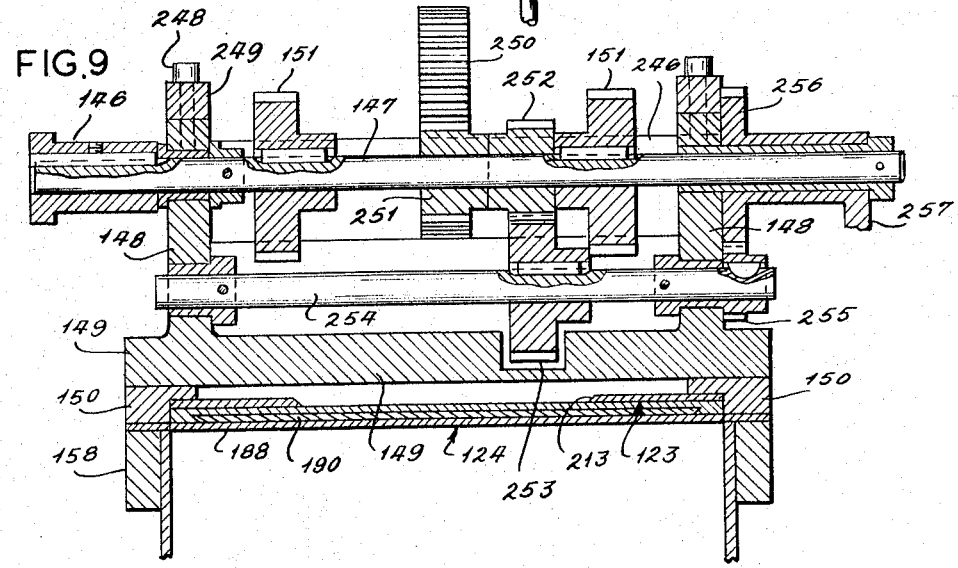
INVENTORS:
ALBERT L. PETRI
HENRY LEWIN
BY Gravely, Lieder & Woodruff
ATTORNEYS.

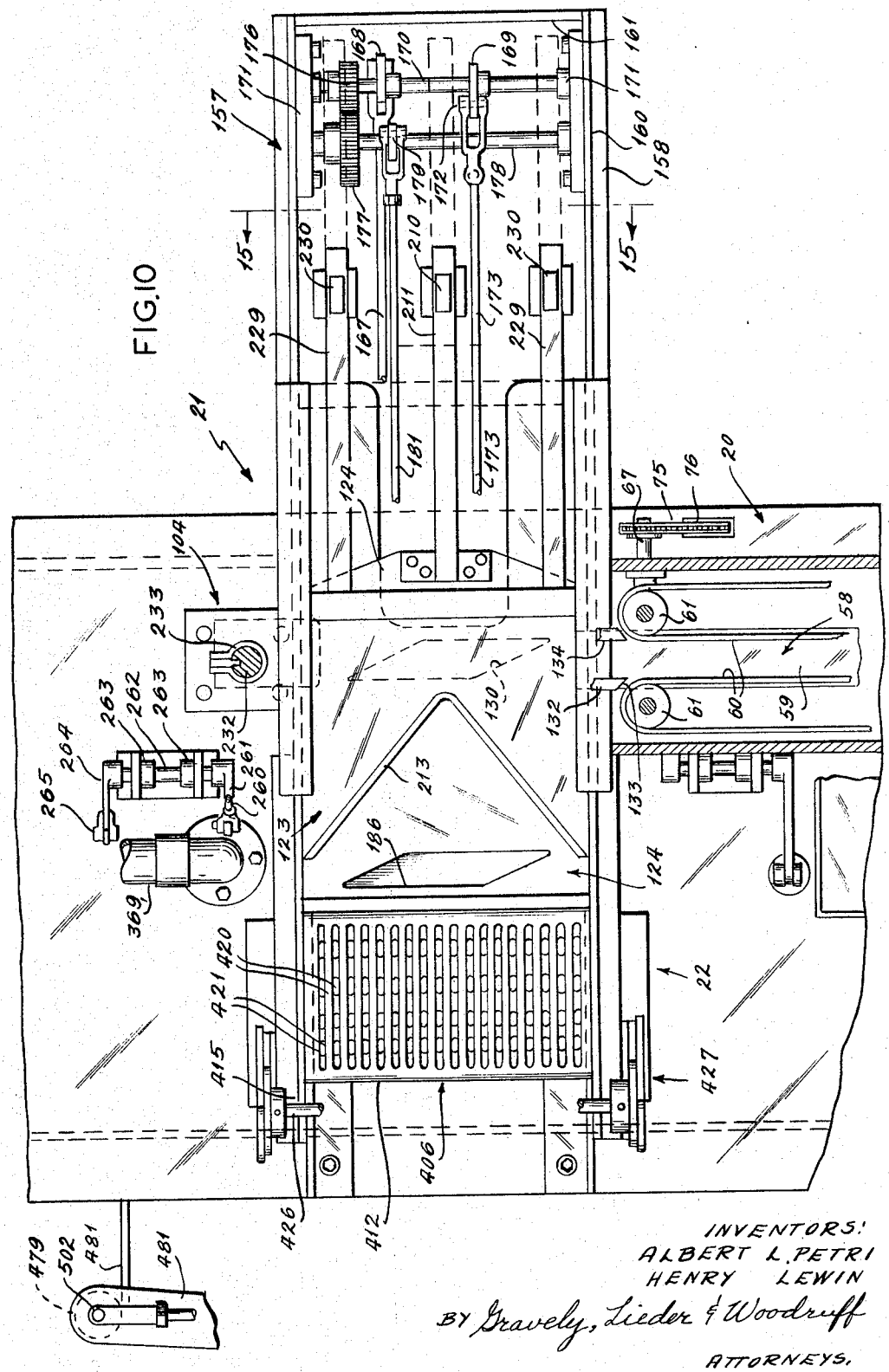

Jan. 17, 1967  A. L. PETRI ETAL  3,298,375
CIGAR MAKING MACHINE
Original Filed March 13, 1959  10 Sheets-Sheet 8
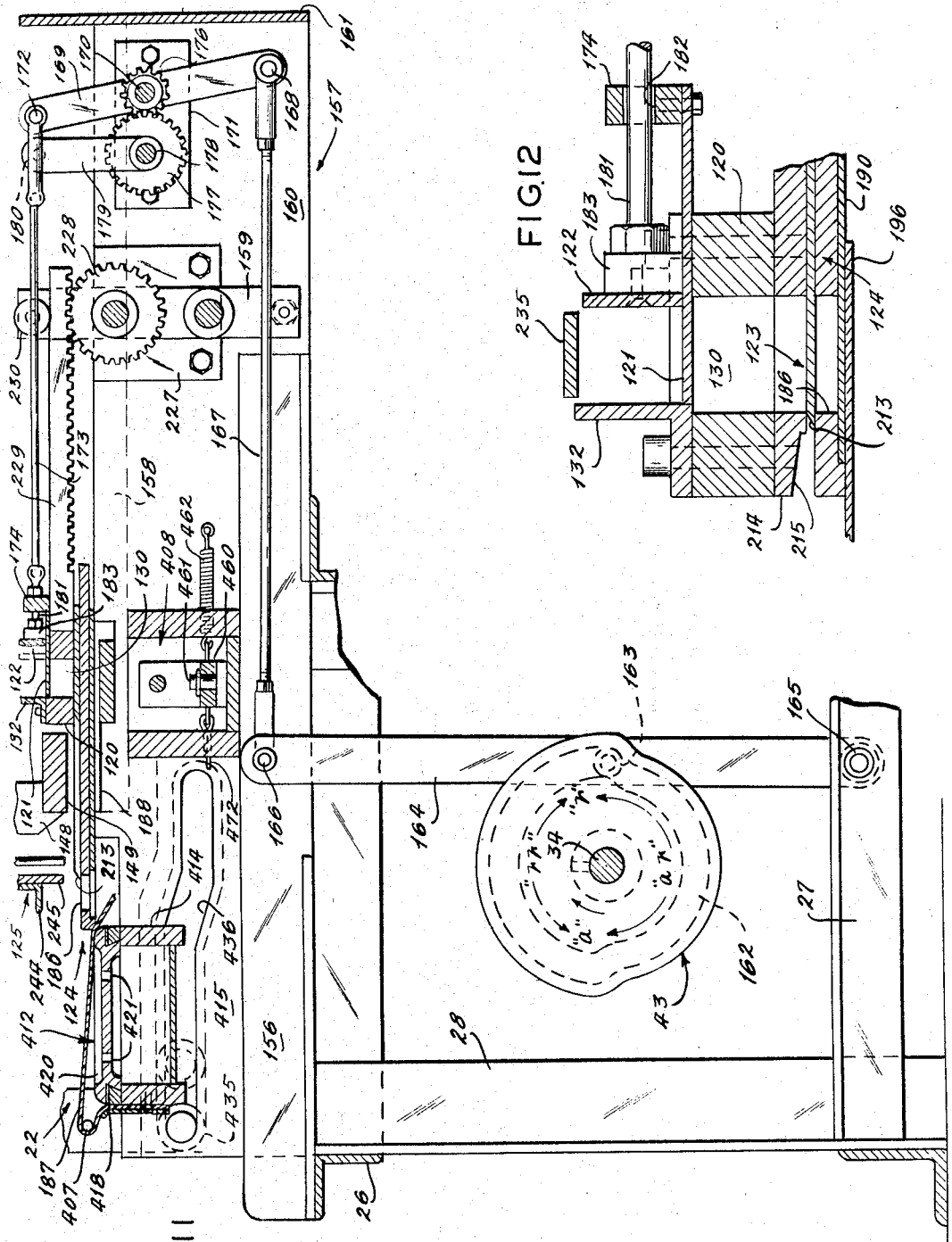
INVENTORS:
ALBERT L. PETRI
HENRY LEWIN
BY Gravely, Lieder & Woodruff
ATTORNEYS.

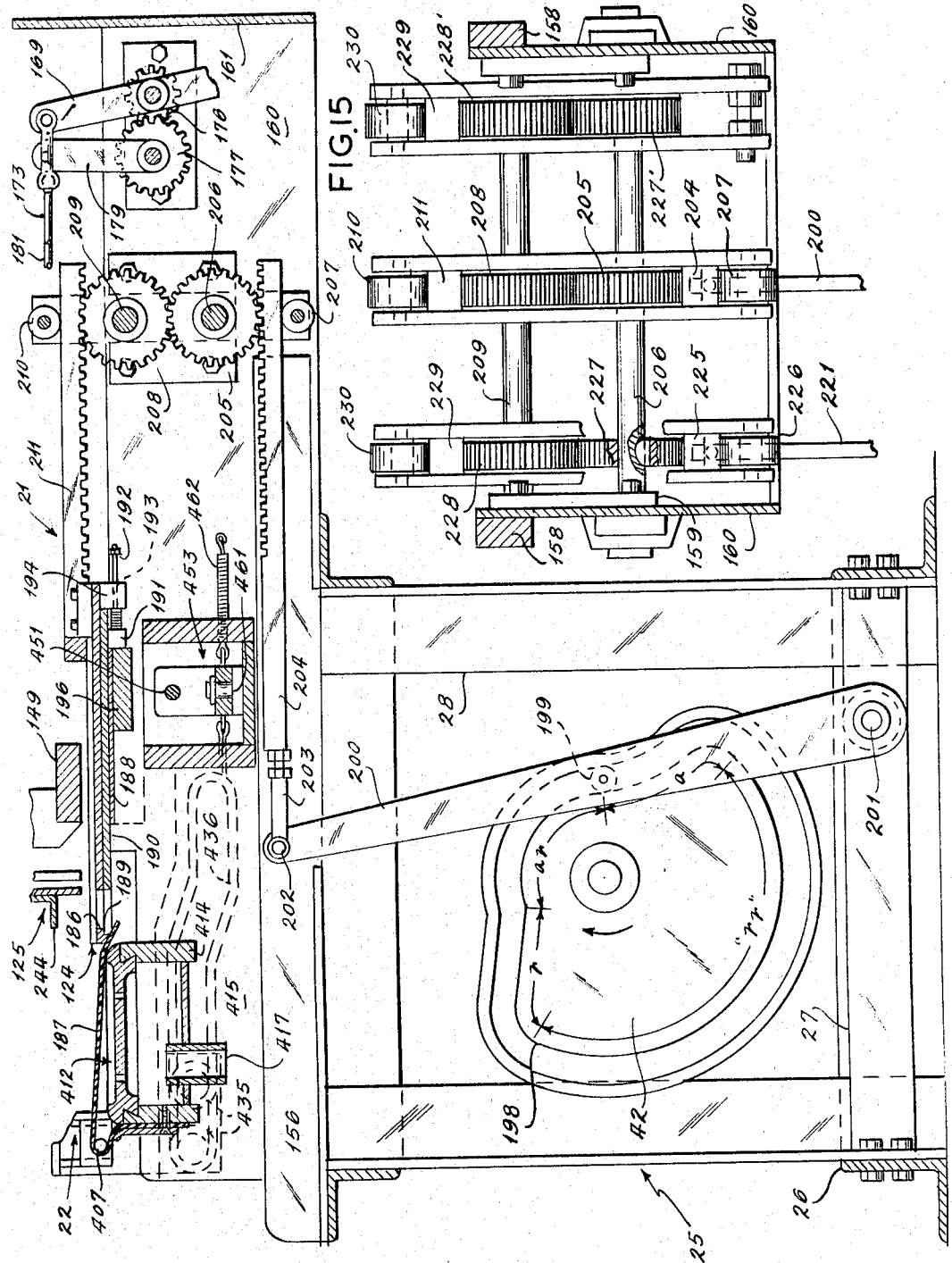

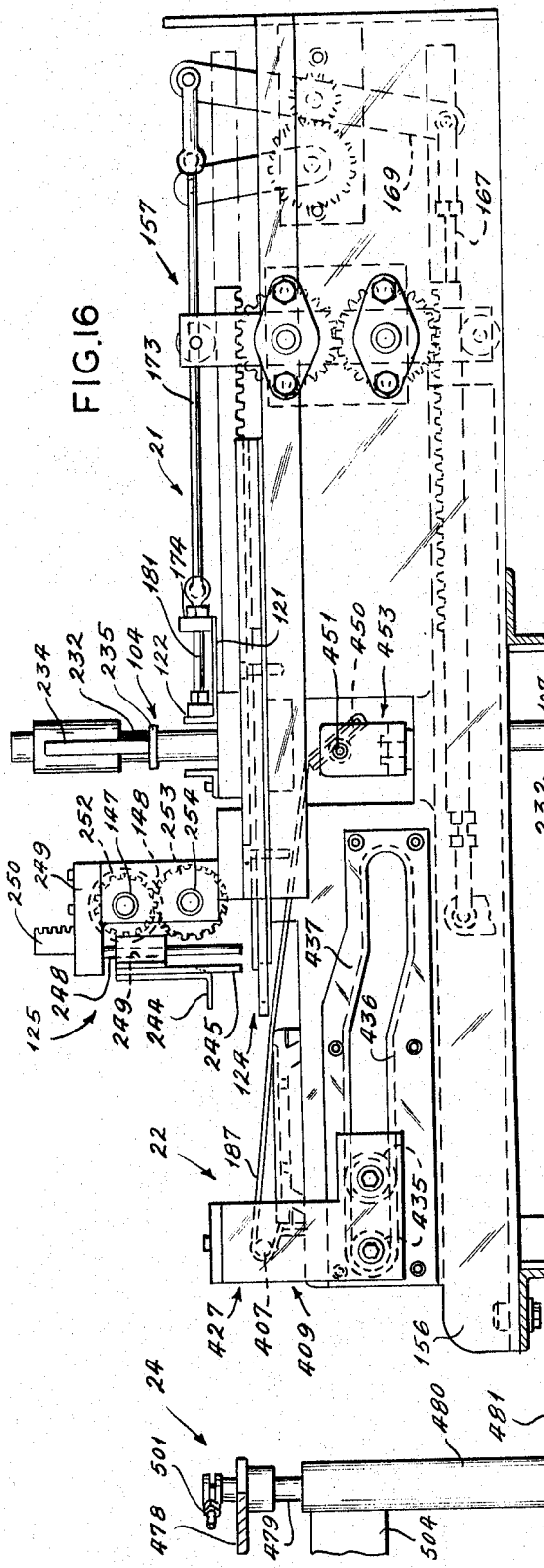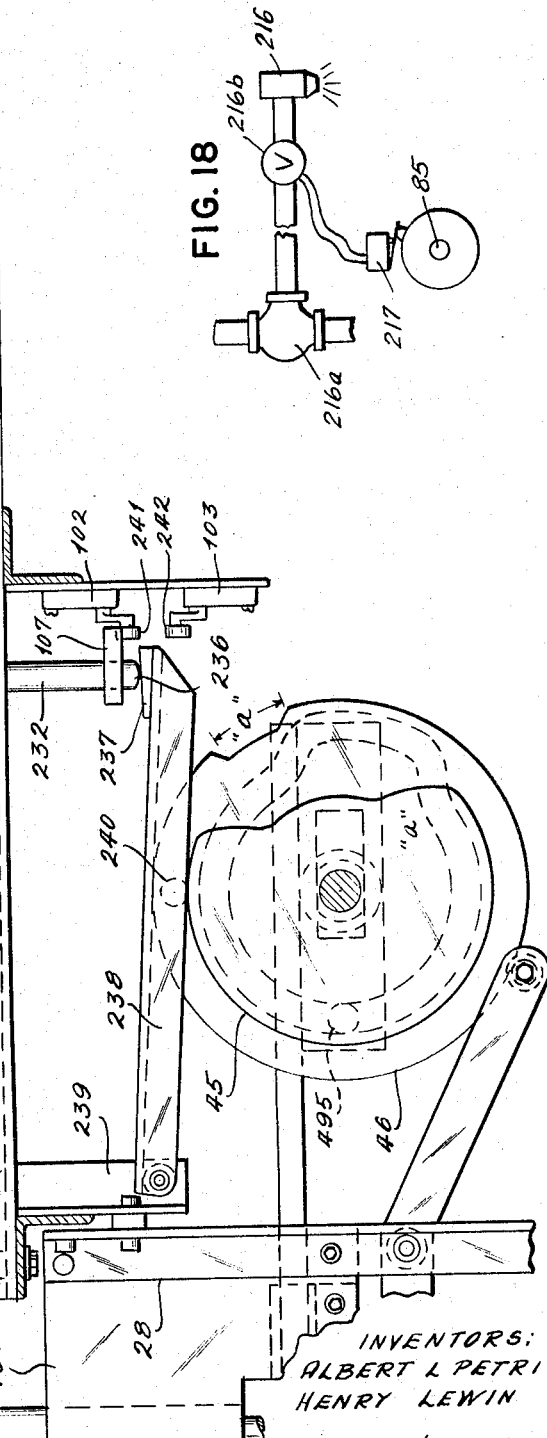
FIG.16
FIG.18
INVENTORS:
ALBERT L PETRI
HENRY LEWIN
BY Gravely, Lieder & Woodruff
ATTORNEYS.

United States Patent Office 3,298,375
Patented Jan. 17, 1967

3,298,375
CIGAR MAKING MACHINE
Albert Louis Petri, Atherton, Calif., and Henry Lewin, Clarksville, Tenn., assignors, by mesne assignments, to Petri Cigar Company, Clarksville, Tenn., a corporation of Tennessee
Original application Mar. 13, 1959, Ser. No. 799,137, now Patent No. 3,105,497, dated Oct. 1, 1963. Divided and this application Oct. 30, 1962, Ser. No. 234,036
6 Claims. (Cl. 131—81)

This is a divisional application of our co-pending application Serial No. 799,137 filed March 13, 1959 for Cigar Making Machine, now Patent No. 3,105,497 granted October 1, 1963.

This invention relates generally to cigar making machines, and more particularly to improvements in automatic mechanisms for manufacturing uniform cigars.

Heretofore many mechanisms and devices have been proposed for mechanically producing cigars having a uniform length and desired shape, using filler, binder and wrapper and applying adhesive on an end portion of the binder and wrapper. However, none of these devices has been entirely satisfactory, particularly for making cheroot, Toscani or stogie type cigars. Although the present cigar making machine is adapted to form various shaped cigars, it will be described hereinafter for purposes of disclosure with reference to the manufacture of stogie cigars as well as cylindrical cigars of indeterminate length to be cut into shorter cigars.

The typical stogie or Toscani cigar has a substantially frusto-conical shape, and two of these cigars are produced by rolling a single cigar having an enlarged central portion and long tapering ends, clipping the ends and then cutting the cigar through the center. In hand-rolled stogie cigars, a bunch or filler is formed of long strands of tobacco and the bunch is then wrapped with a wrapper of fine grade tobacco, the wrapper being provided with suitable paste or adhesive on one or both sides or along the edges thereof, the wrapper going twice around the filler to eliminate the necessity for a conventional binder. Hand-rolled cigars are formed of tobacco having a residual or natural moisture content of substantially 40% to 45%. Inasmuch as the aroma and taste of a cigar are adversely affected by decreases in the moisture content, which cannot be artificially corrected after the cigar is made, it is important that a cigar making machine be adapted to handle such moist tobacco for long periods of time without becoming gummed up and inoperative and without compressing the tobacco forming the filler into a solid mass or plug. Heretofore, mechanisms proposed for rolling cigars have not been able to meet the requirement of using tobacco with a moisture content up to 45%.

Cigar machines heretofore have also had the disadvantages of requiring straightening and other pretreatment of tobacco after fermentation and prior to machine rolling, of being unable to rapidly produce uniform cigars using fillers or bunches formed of different lengths of tobacco, of requiring a great deal of personnel in the operation, inspection and maintenance thereof, and of being expensive to manufacture and maintain and relatively large and heavy.

The principal object of the present invention is to provide an improved cigar making machine which overcomes the disadvantages known heretofore and is adapted to rapidly manufacture uniform cigars having a high moisture content.

Another object is to provide an efficient bunch forming mechanism in which the accumulation or build up of tobacco gum or like derivatives on the machine parts is prevented by the application of water.

Another object is to provide a cigar making machine adapted to form uniform cigars of different length and which is adapted to operate efficiently for long periods of time with tobacco having a high moisture content without requiring down time for cleaning, repair or the like.

Another object is to provide a cigar making machine, the operation of the several mechanisms thereof being in timed relationship and indexed in operation so that the machine may operate at variable speeds and produce uniform cigars at all production speeds.

A still further object is to provide improved mechanisms for forming bunches or fillers.

A still further object is to provide an improved mechanism for manufacturing variously shaped cigars including a cylindrical cigar which may be cut into several shorter cigars.

These and still other objects and advantages will become apparent hereinafter.

Briefly, the present cigar making machine comprises integrated mechanisms for feeding filler tobacco to a bunch forming mechanism, forming predetermined lengths of filler tobacco, cutting the tobacco length to form a filler charge or bunch, and applying water to the cutting means to prevent tobacco accumulations thereon.

In the accompanying drawings which form a part of this specification and in which like numerals refer to like parts wherever they occur:

FIG. 1 is a top plan view of a cigar making machine embodying the present invention, FIG. 2 is a vertical elevational view, partly in section, showing the principal drive means for the machine, FIG. 3 is a vertical cross-sectional view of the cross feed mechanism taken substantially along line 3—3 of FIG. 2, FIG. 4 is a vertical cross-sectional view showing a portion of the drive means for the cross feed mechanism and also showing the vertical cut-off knife cam and mechanism, FIG. 4 being taken along line 4—4 of FIG. 2, FIG. 5 is another cross-sectional view of the cross feed mechanism, vertical knfe and vertical compactor as taken along line 5—5 of FIG. 1, FIG. 6 is a plan view of a portion of the drive means for the cross feed mechanism and switch means in the machine, FIG. 7 is a schematic view of the electrical control means for the cross feed mechanism, FIG. 8 is a plan view of the vertical knife, compactor and knock-out devices, FIG. 9 is a vertical cross-sectional view taken along line 9—9 of FIG. 8, FIG. 10 is a plan view, partly in section, of the cross feed, bunch forming and rolling table mechanisms, FIG. 11 is a vertical cross-sectional view of the slide plate and alignment block and the cam therefor as taken along line 11—11 of FIG. 2, FIG. 12 is a vertical cross-sectional view of the reservoir for the bunch forming mechanism taken along line 12—12 of FIG. 5, FIG. 13 is a vertical cross-sectional view of the transfer box and cam therefor as taken along line 13—13 of FIG. 2, FIG. 14 is a vertical cross-sectional view of the horizontal knife and cam therefor as taken along line 14—14 of FIG. 2, FIG. 15 is a view taken along line 15—15 of FIG. 10 showing a portion of the transfer box and horizontal knife control means, FIG. 16 is a vertical elevational view showing the vertical compactor and the adhesive means and cams therefor and also showing the knock-out device and rolling table mechanism, FIG. 17 is an exploded perspective view showing a typical stogie or Toscani cigar formed in the present machine with the end portions clipped and being severed in the center to form two cigars, and FIG. 18 is a diagrammatic view of water supply means for a spray nozzle.

As shown in FIG. 17, a typical stogie cigar C formed by the present machine is shown for purposes of illustration, but the machine is also adapted to form cigars of other shapes. The cigar C has a central filler *f* rolled in a wrapper *w* and the cigar has end portions *e* trimmed therefrom when the cigar is taken from the present machine by suitable mechanism. The cigar C is also divided at its center to form two frusto-conical cigars from the single cigar made by the machine.

Referring now to the other drawings in detail, it will be seen that the present cigar making machine comprises a cross feed mechanism 20, a bunch forming and transfer mechanism 21, a rolling table mechanism 22, a wrapper forming and transfer mechanism 23 and an adhesive depositing mechanism 24. These mechanisms and the drive and control means therefor are supported on a main frame 25 having longitudinal upper and lower members 26, cross members 27 and vertical members 28. As shown in FIG. 1, the cross feed mechanism 20 is mounted on the left-hand portion of the frame 25, the wrapper forming and transfer mechanism 23 is mounted on the right-hand portion thereof, the bunch forming and transfer mechanism 21 and the rolling table mechanism 22 are mounted on the central portion of the frame 25 in transverse alignment, and the adhesive depositing mechanism 24 is also supported on the central portion of the frame.

Referring to FIG. 2, the machine is powered from a variable speed motor 30 or the like mounted on the main frame 25 and being horizontally adjustable by means 31 for regulating the tension of drive belt 32 which extends around wheel 33 for driving a main shaft 34 through a suitable reducer unit 35 and an overload clutch 36. The main shaft 34 is journaled in bearings in the main frame 25 and carries a plurality of cams 38–49 and sprocket wheel 50, a single revolution of the main shaft 34 effecting a complete cycle of the operation of the machine to produce one cigar. As will be described more fully hereinafter, the cams 38–49 comprise a portion of the drive and control means for the machine and include a vertical knife cam 38, an apron tightening cam 39, a horizontal knife cam 40, a forming roller cam 41, a transfer box cam 42, a slide plate and alignment block cam 43, a swivel bar control cam 44, a compactor cam 45, an adhesive control cam 46, a pick-up head height control cam 47, a knock-out device cam 48 and a pick-up head rotating cam 49.

*Cross feed mechanism.*—The cross feed mechanism 20, FIGS. 1–7, is mounted on a top plate 53 having side and cross members 54 and 55 secured to the underside thereof and spaced above the main frame 25 by vertical members 56. Longitudinal angle members 57 are secured to the plate 53 to form a longitudinal channel 58 in which a horizontal feed belt 59 and spaced vertical feed belts 60 move to define a feed conveyor for carrying a layer of tobacco strips (not shown) to the bunch forming mechanism 21. The forward end of the side belts 60 are mounted on drive pulleys or rollers 61 and the rearward ends extend around idler pulleys or rollers 62. Suitable adjustment means 63 may provide for belt tension adjustment. Cover plates 64 are also provided to cover the top and return side of the belt 60 and to form a flange 65 extending over the upper margin of the delivery portion of the side belts 60. The horizontal or bottom belt 59 has side margins which are positioned under the lower margins of the side belts 60, and the rearward end of the belt 59 extends around an idler roller 66 that can be adjusted longitudinally relative to the top plate 53 to provide for proper belt tension. Mounted on a stub shaft 67 in juxtaposition with the drive rollers 61 is a drive roller 68 for the belt 59. The forward end of the belt extends around an idler roller 69 forwardly of the drive roller 68, and another idler roller 70 is journaled in the frame in position to form a reverse curvature in the belt 59 as it extends around rollers 69 and 70 and drive roller 68. A friction or pressure roller 71 is also mounted adjacent to the periphery of the drive roller 68 so that the belt is firmly held thereagainst to be driven when the roller 68 and shaft 67 are rotated.

The stub shaft 67 carries bevel gears 73 adjacent to the drive roller 68 and each of the drive rollers 61 for the side belts 60 is driven by a bevel gear 74 meshed with one of the bevel gears 73. Mounted on one end of the shaft 67 is a sprocket wheel 75, which is driven by a sprocket chain 76 extending around sprocket 77 on one end of a shaft 78 journaled in bearings 79 secured to the main frame 25. Another stub shaft 80 is journaled in bearings 81 on frame 25 and is axially aligned with shaft 78 and the adjacent ends of these shafts are provided with a suitable magnetic clutch 82 which, when engaged, drives the belts 59 and 60 through the drive means just described. The other end of the shaft 80 is provided with a bevel gear 83 meshed with a gear 84 secured to a longitudinally extending shaft 85 journaled in bearings 86 mounted on frame 25. The shaft 85 has a sprocket wheel 87 driven through a chain 88 from the sprocket wheel 50 on the main drive shaft 34. The stub shaft 85 for transmitting power to the clutch 82 is turned with the main shaft 34 in a 1:1 ratio, and the clutch shaft 80 is preferably in a 2:1 ratio with the shaft 85.

The stub shaft 85 also carries a plurality of cams 90, 91 and 92 for engagement with micro-switches 93, 94 and 95, respectively. The length of the cam surfaces is varied to cause the micro-switches to be closed for different time intervals. The micro-switches 93, 94 and 95 are selectively placed in the electrical circuit 96, FIG. 7, by switch 97 for energizing solenoid 98 of the magnetic clutch 82 whereby the time interval each micro-switch is closed is translated into lineal actuation of the filler tobacco by movement of the feed conveyor 58. A relay coil 100, has normally closed contacts 101 in series with the selector switch 97 and the clutch solenoid 98, and the relay coil is associated with normally open and normally closed limit switches 102 and 103 so that the cross feed mechanism 20 operates only when additional tobacco is required by the bunch forming mechanism 21. A compactor device 104 of the mechanism 21 serves to press tobacco prior to the portion of the machine operation in which the cross feed mechanism is actuated. The normally open switch 102 is an upper limit switch, which is closed by a cam 105 on the compactor device 104 during initial movement thereof toward tobacco pressing position, to energize the relay coil 100 and to open contacts 101 while establishing a hold circuit for the relay coil through normally open contacts 106. Therefore, when the upper switch 102 has been closed by the compactor 104, the relay contacts 101 are open to break the circuit to the clutch solenoid 98 until the relay coil 100 is deenergized.

The normally closed switch 103 is a lower limit switch opened by a cam 107 on the compactor device 104 to break the circuit to relay coil 100 when the amount of tobacco in the bunch forming mechanism 21 is below a predetermined level. Accordingly, the contacts 101 will be closed by the de-energization of relay coil 100 so that on the next revolution of the stub shaft 85 one of micro-switches 93, 94 or 95 is closed by the cam therefor and the cross feed mechanism 20 will be operative. As indicated, by moving the selector switch 97 to a different micro-switch, the time interval of cross feed actuation can be controlled to provide longer or shorter lengths of filler material so that different length cigars may be made.

The cross feed mechanism 20 includes a shelf 109 on which strips of filler tobacco are placed and from which these strips may be laid in the feed conveyor channel 58 by an operator to form a layer of tobacco which is fed intermittently forwardly by the engagement of the clutch 82 to deliver a predetermined length of filler material to the bunch forming mechanism 21.

The cross feed mechanism 20 also includes a vertically reciprocable pressure member 110, which is associated with a vertical cutter knife 111 of the bunch forming mechanism 21 and is actuated simultaneously therewith by the cam 38. As shown best in FIG. 5, the pressure member 110 comprises a shoe 112 carried on rods 113 extending through openings in a horizontal carrier member 114, and springs 115 are positioned around the rods 113 between the shoe 112 and member 114 to bias the former downwardly. The shoe 112 has an upwardly turned rearward lip 116 to facilitate the feeding of tobacco beneath the shoe. A roller 117 carried on arm 118 pivotally mounted on the frame is positioned in the cross feed channel rearwardly of the pressure member, FIGS. 1 and 2. The roller 117 rides on the tobacco in the channel and presses the tobacco and assists in directing it under the shoe 112.

In operation, the pressure member 110 and the knife 111 are in raised position during cross feed actuation by the cam 38, as will be described more fully in connection with the knife device. When the cross feed mechanism is again at rest by the de-energization of clutch solenoid 82, the cam 38 moves the shoe 112 into tobacco pressing contact in the cross feed channel 58 and also moves the knife 111 into tobacco severing position. However, the shoe contacts the tobacco before the knife comes into contact therewith and continued downward movement of carrier member 114 causes springs 115 to exert additional pressure on the tobacco to hold it in fixed position during the cutting operation.

*Bunch forming and transfer mechanism.*—The bunch forming mechanism 21 is positioned to the right of the cross feed mechanism 20 in FIGS. 1 and 2 of the drawings and receives tobacco therefrom as required. The bunch forming mechanism comprises the vertical knife 111, a reservoir block 120, the vertical compactor 104, a slide plate 121, an alignment block 122, a horizontal knife 123, a transfer box 124 and a knockout device 125.

Referring to FIGS. 4, 5 and 8, the knife 111 has a lower cutting edge 127 and is movable vertically into cutting relationship with an undercut forward edge 128 of a fixed lower knife member 129. The cutting edges 127 and 128 of the knife members are in a predetermined angular position relative to the longitudinal direction of movement of the layer of tobacco in the cross feed channel. Accordingly, the end edges of the tobacco layer cut by the knives are angular to form a parallelogram-shaped length of tobacco substantially complementary to the shape of the reservoir opening 130 in the reservoir block 120, FIG. 10.

The bottom belt 59 of the cross feed extends forwardly of the side belts 60 and around idler roller 69 which is journaled in the frame below the lower knife member 129. The rearward margin 131 of the knife 129 is undercut on a radius from the axis of roller 69 and is spaced approximately the thickness of belt 59 from the periphery of the roller 69. The level of the upper surface of knife 129 is below the horizontal plane of the belt 59 so that tobacco from the belt 59 will slide smoothly across the knife 129. An abutment and guide plate 132 is secured to the reservoir block 120 in substantially conterminous relation with the side belt 60 and in vertical alignment with the forward wall of opening 130, the rearward margin 133 being cut angularly to fit immediately adjacent to the drive roller 61 to receive the belt 60 therebetween, FIGS. 8 and 10. Another guide plate 134 is spaced from plate 132 to define an extension of the feed channel, the longitudinally forward end 135 of the plate 134 being behind the position of vertical knife 111. The knife 111 has a side margin 136 in surface contact with the abutment plate 132.

The knife 111 is secured to a block 137 pivotally mounted on carrier member 114 to adjust the knife to different angular positions (as shown in broken lines in FIG. 8) and the lower knife member 129 is one of a set of removable blades having different angular edges complementary to predetermined positions of the knife 111 so that the shape of the tobacco cut may be varied when making other cigars. The control means for actuating the knife 111 and pressure member 110 in the cross feed channel 58 will now be described.

The cam 38 has a closed path surface 139 and a lever 140 has one end 141 pivoted to a frame member 26 and the other end carries a cam follower 142, FIGS. 4, 5, 8 and 9. A vertical rod 143 is pivoted at its lower end 144 to lever 140 and its upper end 145 is pivotally connected to one end of a link 146, which is secured on one end of a shaft 147 journaled in spaced upstanding bearing blocks 148 of a base member 149 rigidly secured to a bunch forming mechanism frame 150 supported on the main frame 25. The shaft 147 has spaced spur gears 151 thereon, which are meshed with toothed vertical racks 152 secured to a guide member 153 vertically slidable on spaced vertical rods 154 secured to the base member 149. The carrier member 114 for the knife 111 and pressure member 110 is rigidly secured to the guide member 153.

The cam 38 is shown in FIG. 4 just entering a rest period in which the guide member 153 is elevated to hold the pressure member 110 and knife in retracted position. The rectracted rest portion of cam surface 139 is designated *rr* and is set out by arrows. The actuation portion of cam surface 139 is designated *a*, and the retraction portion is designated *r*. The cam 38 also has an actuated rest portion shown as *ar*. For purposes of disclosure, all cams will be similarly designated.

When the cam follower 142 moves through the actuation portion *a* of cam 38, the lever 140 is moved upwardly to rotate shaft 147 clockwise in FIG. 4 whereby racks 152 will be actuated downwardly by spur wheels 151 to move the pressure member 110 into tobacco pressing position and to carry the knife 111 into shearing or cutting position with the knife element 129. The cam 38 holds the pressure member and knife in actuated position for rest period *ar* and then retracts them to elevated position. The tobacco thus cut from the cross feed supply is in position over the reservoir opening 120.

Referring now to FIGS. 1, 10, 11, 13, 14 and 16, it will be seen that frame member 156 extend transversely of the main frame 25 and rearwardly therefrom to form a support for a cantilever housing 157 in which control means for the bunch forming mechanism 21 is housed. The housing 157 also includes upper horizontal frame members 158, vertical members 159, and side and end plates 160 and 161.

The reservoir block 120 is mounted above the housing 157 and forwardly thereof over the main frame 25. The slide plate 121 is slidably positioned on top of the reservoir block 120 and the alignment block 122 slides on the slide plate 121. The slide plate 121 is movable between an actuated position in which the reservoir opening 130 is uncovered to receive bunch lengths of tobacco from the cross feed mechanism 20 and a retracted position in which the plate 121 abuts the abutment and guide plate 132 to cover the opening 130 so that the slide plate 121 supports tobacco thereon when the cross feed mechanism is actuated and while it is being cut by the vertical knife 111. The alignment block 122 cooperates with the slide plate 121 and moves opposite thereto between an actuated position and a retracted position. In actuated position, tobacco on the slide plate is pushed against the alignment plate 132 in vertical alignment with the reservoir opening 130 as the slide plate is actuated to a withdrawn position so that the filler tobacco will be discharged into the opening 130 and form a vertical stack therein. In retracted position, the alignment block 122 moves away from the plate 132 as the slide plate moves to retracted or closed position over the reservoir opening 130 so that the cross feed tobacco will pass between the plate 132 and block 122.

The slide plate and alignment block 121 and 122 are controlled by the cam 43, FIG. 11, having a closed cam surface 162 in which follower 163 is positioned. The follower 163 is mounted intermediate the ends of a lever 164, the lower end 165 of which is pivoted to frame cross member 27 and the upper end 166 being pivoted to one end of a drive rod 167. The other end 168 of the rod 167 is pivotally connected to the lower end of link 169, which is secured intermediate its ends to cross shaft 170 journaled in end bearing members 171 mounted on side plates 160 of the housing 157. The upper end 172 of link 169 is connected to rod 173 and the other end of the rod 173 is secured to a connecting element 174 secured to the rearward edge of the slide plate 121.

The shaft 170 also a spur gear 176 thereon which is meshed with a spur gear 177 on a shaft 178 journaled in the end bearing members 171. One end of a link 170 is secured to the shaft 178 and the upper end 180 of the link 179 is pivoted to a rod 181. The rod 181 extends through an opening or notch 182 in connecting element 174 and has its end secured to a back plate 183 on alignment block 122, FIG. 12.

The cam 43 is shown in FIG. 11 beginning the rest portion of its cycle in which the slide plate 121 and alignment block 122 are in retracted positions. In the actuation portion a, cam 43 withdraws slide plate 121 from over the reservoir opening 130 by moving the drive rod 167 to the left and rotating the shaft 170 and gear 176 clockwise. The shaft 178 is thus rotated counterclockwise by gear 177 to pivot link 179 to the left and actuate the alignment block 122 toward plate 132. In the retract portion r of the cam 43, the reverse action takes place. Inasmuch as the rod 181 extends through the opening 182 in element 174, the rods 173 and 180 are kept parallel for rectilinear movement of the slide plate 121 and alignment block 122.

The transfer box 124 and the horizontal knife 123 are positioned beneath the reservoir block 120 and are movable transversely relative to the main frame 25. The transfer box 124 is spaced below the reservoir block and has an opening 186 similar to the reservoir opening 130, these openings being aligned when the box 124 is retracted. The box is adapted to be actuted to a forward position toward the rolling table mechanism 22 to deposit a tobacco bunch for one cigar on a flexible apron 187 forming a portion of the rolling table mechanism. The transfer box 124 is formed of an elongated plate of predetermined thickness and slides on an imperforate plate 188 of bearing material secured to the frame members 158. The lower surface of the box 124 is relieved to form an open ended channel 189 in which a bottom cover 190 is positioned, FIGS. 11–14. Spaced blocks 191 are secured to the bottom of the cover 190 at the rearward end thereof, and rods 192 extend rearwardly from the blocks 191 through openings 193 in blocks 194 secured below the end of the transfer box 124. Springs 195 on the rods normally bias the cover 190 forwardly to a closed position relative to the transfer box opening 186. A stop member 196 is secured between the frame members 158 in position to be contacted by the cover blocks 191 near the bunch discharge position of the transfer box 124 during the actuation thereof so that the forward movement of the cover 190 will be stopped to open the bottom of the transfer box.

The cam 42 for controlling the movement of the transfer box 124 has a cam surface 198 in which is positioned a follower 199 connected intermediate the ends of lever 200, the lower end 201 of the lever being pivoted to frame member 27 and the upper end 202 being pivotally connected to rod 203, FIGS. 13 and 15. A toothed rack 204 has one end connected to the rod 203 and the rack is meshed with a spur gear 205 which is positioned intermediate the ends of a shaft 206 and is rotatable relative to the shaft. An idler roller 207 is positioned below the gear 205 to support the rack 204 and maintain it in engagement with gear 205. Another spur gear 208 is freely rotatable on a shaft 209 and is meshed with the gear 205, and another guide or idler roller 210 is spaced above gear 208 to maintain another toothed rack 211 in mesh with the gear 208. The rack 211 is secured to the center of the rear margin of the transfer box 124 and it is apparent that the transfer box is driven by cam 42 through lever 200, rack 204, gears 205 and 208 and rack 211.

The actuation portion a of cam 42 is substantially completed in FIG. 13 and the cam is moving into the actuated rest portion ar in which the transfer box 124 is forward in bunch discharging position. When the follower 199 moves along the retract portion r of cam 42, lever 200 and rack 204 will move to the right to rotate gear 205 counterclockwise and gear 208 clockwise thereby moving rack 211 to the right also.

The horizontal knife 123 is positioned between the reservoir block 120 and the transfer box 124 and is slidable on each, the knife 123 having a retracted position in which the transfer box 124 is retracted and the opening 186 thereof forms a portion of the reservoir opening 130. The horizontal knife is movable to an actuated forward position in which the tobacco in the vertical stack is severed across the top of the box 124 to form a bunch for making one cigar. It is apparent that the transfer box remains in retracted position until the knife 123 is fully actuated, and the box is then actuated to bunch discharging position and again fully retracted to reservoir position before the knife is retracted. Accordingly, the knife forms a bottom for the reservoir opening 130 during transfer box actuation and retraction to maintain the vertical stack of tobacco thereabove.

The horizontal knife 123 has a V-shaped cutting margin 213 to facilitate the clean cutting of tobacco, which is an important feature of the operation of any cigar machine, FIG. 10. As shown in FIG. 12, the bottom portion 214 of the reservoir block 120 is formed of hardened material and the forward lower portion of the block in front of the opening 130 therein is cut away, as at 215, to reduce the area against which the knife 123 must slide whereby the tendency for tobacco stain or gum to adhere to the knife and be transferred to the reservoir block will be minimized.

In the treatment of extremely moist tobacco, the tendency for the blade or knife 123 to accumulate tobacco gum or other derivatives and also to deposit gum on the reservoir block is accentuated. However, it has been discovered that by spraying a fine mist of water on the knife each time it is retracted no gumming will occur. Accordingly, a spray nozzle 216, FIG. 1, is connected to a supply of water 216a and positioned to eject a spray on the knife particularly in the corner of the V or at the conjunction of the sides of the edge 213. The water valve 216b for the nozzle 216 may be opened by any suitable means, such as a cam actuated micro-switch 217 on shaft 85, FIGS. 6 and 18, to supply a limited or predetermined amount of water during each cycle to properly irrigate the cutting element.

The control means for the horizontal knife 123 is similar to the means for actuating the transfer box 124, FIGS. 14 and 15. The cam 40 has a cam surface 219 on which is positioned a follower 220 mounted intermediate the ends of a lever 221, the lower end 222 being pivoted on cross frame member 27 and the upper end 223 being pivoted to a rod 224. A toothed rack 225 has one end secured to the rod 224 and the rack 225 is supported on a guide roller 226 in mesh with a spur gear 227 secured to one end of the shaft 206. A similar gear 227' is also secured on the other end of shaft 206 to be turned by it. Upper gears 228 and 228' are keyed to the shaft 209 and are meshed with gears 227 and 227' and with racks 229 which are connected to the rear portion of the knife 123 adjacent to the sides thereof. The racks 229 are kept in engagement with gears 228 and 228' by guide rollers 230.

In FIG. 14, the cam 40 is shown in its actuated rest portion *ar* in which the knife 123 is under the reservoir opening 130. However, the transfer box 124 is shown in retracted position as at the end of a cycle just prior to the retraction of the knife.

Referring now to FIGS. 5, 8 and 16, the vertical compactor device 104 will now be described in detail. The compactor device 104 comprises a vertical rod 232 slidably mounted in a keyed guide sleeve 233 and having a laterally extending arm 234 adjustably secured adjacent to its upper end. A plate 235 having a shape substantially complementary to the shape of the reservoir opening 130 is secured to the arm 234 in vertical alignment with the opening. The lower end 236 of the compactor rod 232 is positioned on a shoe 237 mounted on one end of a lever 238, which has its other end pivoted to a frame member 239. A follower 240 is mounted on the lever 238 intermediate its ends, and is positioned against the outer periphery of an open cam 45, FIG. 16. The cam or switch contact member 107 connected to the compactor or plunger device 104 is just above follower 241 for the upper normally open switch 102 and is adapted to contact successively contact follower 241 to make switch 102 and a follower 242 for normally closed switch 103 when the amount of tobacco in the reservoir opening 130 is low so that the cross feed mechanism 20 will be actuated. The cam 45 has fast acting actuation and retraction portions, a short actuated rest portion, and a long retraction rest portion (just beginning in the position shown in FIG. 16). The compactor 104 is actuated when the slide plate and alignment block 121 and 122 are actuated and before the horizontal knife 123 is actuated so that the vertical stack of tobacco will be pressed to a predetermined density while the horizontal knife is severing a bunch in the transfer box 124. The compactor 104 is then raised to complete its cycle.

The bunch forming mechanism 21 also includes the knock-out device 125 which is adapted to be actuated vertically downwardly through the opening 186 in the transfer box 124 to assure removal of all tobacco for one bunch therefrom. The knock-out device also forms a loop in the apron 187 to receive the bunch. As shown in FIGS. 8–11, the knock-out device 125 comprises a parallelogram-shaped plate 244 substantially complementary to the opening 186 of the transfer box 124, and a loop forming vertical plate or finger 245 which extends below the plate 244. These plates 244 and 245 are secured to a rigid guide member 246 having vertical bores 247 in which rods 248 extend, the rods being secured at their upper ends to members 249 fixed to the tops of the bearing blocks 148 supporting the shaft 147 for the vertical knife gears 151. A vertical toothed rack 250 is secured to the center of the guide member, and the rack 250 is meshed with a spur gear 251 freely rotatable on the shaft 147. The spur gear 251 is secured to another gear 252 which rides freely on the shaft 147 and this gear is meshed with a gear 253 mounted on a lower shaft 254 journaled between the bearing blocks 148. A small gear 255 is mounted on the end of the shaft 254 and a larger gear 256 freely rotatable on the end of upper shaft 147 is meshed with gear 255, the large gear 256 having one end of a link 257 secured thereto.

The link 257 is pivoted, at 259, to the upper end of a connecting rod 260, FIG. 10, the lower end of which is pivotally connected to one end of a link 261 secured to a stub shaft 262 journaled in bearings 263. The other end of stub shaft 262 has a link 264 secured thereto and the upper end of a rod 265 is pivoted to the link 264 and to one end of a lever (not shown) that is pivoted to the frame 25 and has a cam follower carried on the cam 48.

It is apparent that the knock-out device 125 is reciprocated down and up in operation to perform the function of knocking tobacco from the transfer box 124 and simultaneously forming a loop in apron 187. During actuation, link 257 turns shaft 258 counterclockwise to rotate the gear 256 and turn gear 255, shaft 254 and gear 253 clockwise so that gears 252 and 251 will turn counter thereto for moving the rack 250 downwardly. The retraction portion of the operation of the knock-out device 125 is the opposite.

*Wrapper forming and transfer mechanism.*—The wrapper forming mechanism 23, FIG. 1, is positioned to the right of the bunch forming mechanism 21 and is adapted to form a wrapper from a tobacco leaf in which the bunch is rolled to form a cigar. The wrapper forming mechanism 23 comprises a rotary table 273 having spaced dies 274 thereon, a cutting roller assembly 275 for cooperation with the dies 274 to form a wrapper, a pick-up or transfer device 277 for carrying a wrapper from the rotary table 273 to a predetermined position on the apron 187, and suitable vacuum connection means (not shown).

The main frame 25 has a top plate 280 on which the rotary table 273 is mounted for rotation between indexed tobacco leaf supply and wrapper transfer positions of each die 274. Each die 274 is defined by an upper cutting edge 292 from which a plurality of slots 298 radiate and have a vacuum to hold the tobacco leaf scrap. The dies have a central head 299 perforated at 300 through which a vacuum is pulled to hold the wrapper thereon. The dies 274 are diametrally spaced on the rotary table 273 so that one will be moved from ejecting to supply position while the other moves from supply to ejecting position. However, the rotary table 273 will only be actuated 180° in each complete cycle of the remainder of the machine to provide one wrapper for the single bunch that is formed. These supply and ejecting positions are predetermined stations between which the dies move each time the rotary table 273 is actuated. At the former a tobacco leaf is spread over the die 274 and the table then revolves to carry the die under roller assembly 275 to the wrapper transfer position from which the formed or cut wrapper is carried by the pick-up head mechanism 277 to the rolling table apron 187.

The pick-up or transfer device 277 for transferring a wrapper from the die 274 of the rotary table 273 to the rolling table apron 187 comprises a horizontally extending arm or tube 369 rotatably mounted and carrying a pick-up head 370 on its free end. The pick-up head 370 is adapted to be moved from the wrapper transfer position of the rotary table dies 274 in a horizontal path to a wrapper deposit position above the rolling table apron 187 and the pick-up head 370 is then reciprocated downwardly and upwardly to deposit the wrapper in a predetermined position on the apron 187. The pick-up head 370 is provided with means for controlling the position of the head relative to the arm 369 to selectively index the head over the apron 187 in either a right-hand "R.H." or left-hand "L.H." position of the apron.

*Rolling table mechanism.*—The rolling table mechanism 22 is positioned in transverse alignment with the bunch forming mechanism 21 and is longitudinally offset from the wrapper forming mechanism 23 to receive fillers or bunches from the former and wrappers from the latter, and is actuated to roll the wrappers around the filler material to make cigars, suitable adhesive being applied to the wrappers prior to the rolling operation. The rolling table mechanism comprises the flexible apron 187, a forming table 406, a forming roller 407, apron tightening means 408, forming roller control means 409, apron control means 410 and suitable vacuum means (not shown).

As shown in FIGS. 10, 11, 13 and 14, the forming table 406 includes a head plate 412 with a vacuum housing 414 secured to side plates 415 fastened to the frame members 156 extending across the main frame 25. The vacuum housing 414 has an inlet conduit 417 connected to suitable vacuum means through a valve (not shown), and the forward end of the apron 187 is secured to the housing 414 by a plate 418. The head plate 412 is provided with a plurality of channels 420, the bottom of each of which is in communication with the vacuum housing 414 through elongated perforations 421 or the like. The channeled upper working face of the head plate 412 has a vacuum thereon at all times except during a brief portion in the operation of the machine when the wrapper from the rotary table 273 is being deposited thereon. The apron 187 is unattached along the sides, and its rearward margin is secured to the apron tightening means 408. As shown best in FIG. 1, the apron 187 is perforated at 422 to provide passages in communication with the head plate 412, the perforations 422 being in the right and left-hand leaf patterns "R.H." and "L.H."

The forming roller 407 extends across the forming table 406 and is movable from a fully retracted position spaced rearwardly of the table to a fully actuated rest position, FIG. 11. The roller 407 has a concave central area, the angularity of which is predetermined, and the concavity of the head plate working surface and the roller 407 is substantially complementary to the desired shape of the cigar to be formed by the machine. Each end of the shaft 426 for the roller 407 is carried by a carriage assembly 427 carried by a pair of spaced wheels 435 riding on a track 436 formed in a carriage guide member secured to the side plate 415 of the forming table 406. The track 436 has a lower rearward portion in which the forming roller 407 is in retracted position behind and below the head plate 412, an upper forward portion in which the actuation of the forming roller to roll a cigar takes place, and an angular portion connecting the other portions for moving the forming roller 407 above the head plate 412 to the upper position. Actuation of the carriage control means 409 is provided by suitable linkage to the cam 41.

The apron tightening means 408 is also related to the operation of the rolling table mechanism 22 and will be briefly described with reference to FIGS. 11 and 14. The rearward margin of the apron 187 extends around and is secured to a cross bar 450 fastened to a cross shaft 451 rotatably mounted in side plates 452 of a swivel mechanism 453 forming a portion of the apron control means 410. One end of the shaft 451 has a sprocket wheel secured thereto and a sprocket chain 455 extends around the wheel and around another sprocket wheel rotatable on the main frame 25. The chain 455 is driven by lever means controlled by the cam 39 to tighten and loosen the apron 187 during the rolling operation.

The apron control means 410 includes the swivel mechanism 453, which has the side plates 452 supporting the shaft 451 and a base member 460 mounted on a central vertical pivot 461. A tension spring 462 is connected between one side of the base member 460 and the frame to exert a predetermined force tending to turn the bar 450 to an angular position whereby the tension on one side of the apron will be increased and the other side of the apron will be loosened. The apron control means 410 also includes the cam 44 from which drum means exerts a force on a cable 472 to overcome the spring tension and position the swivel member 453 to control the apron 187 during a cigar rolling operation.

*Adhesive deposition mechanism.*—The mechanism 24 is provided to deposit a suitable amount of adhesive in a predetermined pattern on the wrapper leaf prior to the actuation of the rolling table mechanism 22 so that the wrapper will remain rolled about the bunch. Referring to FIGS. 1, 10 and 16, and adhesive mechanism 24 may consist of a suitable sponge or brush carried on a rigid plate 476 mounted on a vertical pivot pin 477 journaled in one end of arm 478. The other end of arm 478 is secured to a vertical shaft 479 rotatably and slidably mounted in a vertical sleeve 480 secured to a frame member 481. The arm 478 is rotated by suitable drive means from the cam 46, FIG. 16, and is lowered from an elevated position into contact with a wrapper on the apron 187, then raised and swung back to its remote position.

When the adhesive brush head is in retracted position it is to the left of the rolling table apron 187 and forwardly thereof. An adhesive receptacle 498 is mounted on the frame and supports a roller 499 against which the brush is adapted to move to pick up a layer of adhesive.

The brush 475 is shown in FIG. 1 to be in position to apply adhesive to a right-hand wrapper leaf. However, linkage is provided to adjust the pivotal points of the brush so that during movement to the adhesive depositing position it will turn about pivot pin 477 to assume an indexed position above the apron 187 corresponding to the left-hand wrapper leaf position "L.H." The pivot pin 477 has a link 500 rigidly secured thereto and a connecting rod 501 is pivoted to the link 500 and its other end is pivoted to a pin 502 secured in axial alignment with the axis of shaft 479. This arrangement is provided for holding the brush in fixed position for applying an adhesive to right-hand wrappers on the apron 187. However, another mounting member 503 for the pivot pin 502 is spaced from the shaft 479 by a frame piece 504 so that the pin 502 can be moved to this position and the connecting rod 501 may be adjusted so that the brush will move to coincide with the left-hand leaf position.

The details and full operation of the wrapper forming means 23, the rolling table means 22 and the adhesive means 24 are set out in parent application Serial No. 799,137, now Patent No. 3,105,497.

*Operation*

In a single revolution of main shaft 34, the cooperable mechanisms of the present machine function to produce a single rolled cigar. A filler is formed by building up a vertical stack of strips of tobacco or the like in the cross feed 20, which is actuated periodically in timed relationship with the operation of the bunch forming mechanism 21 to deliver the filler or bunch tobacco thereto. Variable length actuation of the cross feed mechanism 20 may be effected to produce fillers of different lengths, and cross feed actuation is provided only when the amount of tobacco in the bunch forming mechanism 21 is below a predetermined level.

The filler material delivered to the bunch forming mechanism is severed by the vertical knife 111 which is adjustably positioned at an angular position relative to the direction of cross feed actuation to provide predetermined taper at the ends of a cigar produced. Of course, cylindrical cigars may be produced by the present machine and a knife extending perpendicular to the direction of cross feed would be desired. The filler material is stacked in the vertical reservoir 130 having side walls substantially complementary to the shape of the filler material, the transfer box 124 defining the bottom of the reservoir. The filler tobacco is compressed and severed horizontally by the V-shaped knife 123 to form a bunch for a cigar, and the transfer box 124 is then actuated to a bunch depositing position over the rolling apron 187 of the rolling mechanism 22. Knock-out means 125 is reciprocated through the box 124 to form a loop in apron 187 and to assure complete bunch tobacco discharge into the apron loop forwardly of the cigar forming roller 407. When the box 124 is retracted to its reservoir position and the knife 123 is retracted, the water spray means 216 is actuated to form a mist on the knife whereby high moisture tobacco may be used without building up gum deposits.

The wrapper forming mechanism 23 includes the rotary table 273 having spaced dies 274 alternately operative with successive cycles of the rest of the machine to form a wrapper from either right or left-hand portions of a tobacco leaf. Cutter rollers cooperate with the dies 274 and are pivotally mounted on fixed bases to form the wrapper, and the transfer mechanism 277 is operative in timed relation with the rotary table 273 and the rolling table mechanism 22 to transfer a wrapper from the die 274 to a predetermined position on the rolling apron 187. Either right-hand or left-hand wrapper leaf transfers may be made to angularly related positions on the apron 187 from a single indexed die position of the rotary table.

Similarly, automatic adhesive mechanism 24 is operative in timed relationship with the transfer mechanism 277 and rolling table mechanism 22 to deposit adhesive in a predetermined position on either the apron 187 or the wrapper, or on both the apron and the wrapper.

The rolling table mechanism 22 includes the forming roller 407, which is actuated subsequent to wrapper and adhesive deposit to close the apron loop around the bunch of filler tobacco and carry the bunch in a series of steps across the wrapper to form a single cigar. Mechanism 410 effectively controls the angular position of the forming roller 407 relative to its direction of actuation to form a cigar of predetermined configuration, and it is apparent that a variety of cigar shapes may be formed. Cylindrical cigars require straight line actuation of the roller 407 only. The apron tension is also controlled by means 408 which at the end of forming roller actuation draws the apron to its tautest condition to raise the roller and discharge a cigar from the apron onto suitable mechanism for trimming and cutting the cigar to suitable lengths. In this manner, more than one cigar may be formed by a single operation of the present machine.

It is now apparent that a greatly improved cigar making machine has been provided, one which is adapted to form cigars from tobacco having a high moisture content and having cooperable mechanisms for rapidly and accurately forming cigars.

Changes and modifications are contemplated, which will be readily apparent to all those skilled in the art, and the scope of the present invention is to be limited only by the claims which follow.

What we claim is:

1. In a bunch forming mechanism of a Toscani cigar machine having a cross feed channel, a measuring reservoir, and at least one cutting element associated with said measuring reservoir and movable from a remote position to a cutting position for severing filler tobacco to a predetermined bunch dimension, the combination of water supply means for intermittently supplying a predetermined amount of water to said cutting element at regular intervals of its movement in the operation of said machine.

2. In a cigar making machine for making Toscani cigars with filler tobacco having a moisture content up to about 45%, a knife movable between retracted and actuated positions for cutting a vertical stack of said filler tobacco, and spray means operable in the retracted position of said knife for providing an aqueous mist on at least a portion of the cutting surface of the knife.

3. In a cigar making machine for making Toscani cigars with tobacco filler material having a moisture content up to 45% and including cross feed and bunch forming mechanisms, the latter including a reservoir intermittently receiving said filler material from the former, first knife means for cutting a parallelogram shaped length of filler material, said knife means comprising upper and lower cooperating knife members having straight line cutting edges angularly position relative to the direction of cross feed movement of said filler material, second knife means for forming bunch charges in said reservoir, and means for supplying fluid to said second knife means to prevent tobacco accumulations thereon.

4. A cigar making machine for making Toscani cigars with filler tobacco having a moisture content up to about 45% comprising bunch forming means for forming a bunch of said filler tobacco including a vertical reservoir, means for feeding said filler material to said vertical reservoir, angular knife means for cutting the filler material to bunch lengths, other knife means for cutting the bunch lengths to bunch thickness, and spray means associated with one of said knife means for ejecting a fluid mist on said one knife means in timed relation with machine operation to thereby prevent tobacco derivative accumulations thereon.

5. In the bunch end of a Toscani cigar machine having a cross-feed channel, a measuring reservoir, a cutting element reciprocable into and out of the measuring reservoir to sever a measured charge therein, a transfer beneath said cutting element to deliver said measured charge from said reservoir, means to supply water to irriagte and cleanse said cutting element, means connected to said water supply means for limiting the amount of said supply to the quantity required for said irrigating and cleansing and to restrict the time of supply to a predetermined interval of cutting element reciprocation in the operation of said machine.

6. In the bunch end of a Toscani cigar machine having a filler feed channel, a presser member positioned in said filler feed channel to engage and compress filler tobacco transported therein, vertical knife means operative to sever a stream of filler tobacco, a support surface connected with said filler feed channel to support filler tobacco during operation of said vertical knife means, a measuring reservoir to receive said severed tobacco, other knife means movable from a retracted position through said measuring reservoir to sever a bunch charge therein, drive means for said machine, a source of supply of water, means for discharging water to said other knife means, means communicating said source of supply of water with said means for discharging water in predetermined controlled quantities including means operatively connected with said drive means of said machine to supply water to cleanse said other knife means in timed relation with the operation of said machine.

References Cited by the Examiner

UNITED STATES PATENTS

| | | | |
|---|---|---|---|
| 42,484 | 4/1864 | Holbrook. | |
| 140,693 | 7/1873 | Faul. | |
| 428,208 | 5/1890 | Hammerstein. | |
| 828,062 | 8/1906 | Sherwood | 146—146 |
| 1,188,549 | 6/1916 | Marsh. | |
| 1,325,726 | 12/1919 | Kuhn. | |
| 1,429,250 | 9/1922 | Paylor. | |
| 1,805,694 | 5/1931 | Halstead | 131—81 |
| 1,838,115 | 12/1931 | Schussler | 131—21 |
| 1,888,805 | 11/1932 | Peterson. | |
| 1,909,672 | 5/1933 | Hammersley | 146—1 |
| 1,944,577 | 1/1934 | Rose. | |
| 1,981,469 | 11/1934 | Rundell. | |
| 2,021,652 | 11/1935 | Halstead | 131—42 X |
| 2,284,472 | 5/1942 | Halstead | 131—21 |
| 2,329,183 | 9/1943 | Burns | 131—81 |
| 2,464,896 | 3/1949 | Schreiber. | |
| 2,470,766 | 5/1949 | Durning | 131—21 |
| 2,571,618 | 10/1951 | Rundell | 131—80 |
| 2,611,403 | 9/1952 | Schafer | 146—17 |
| 2,667,173 | 1/1954 | Wheeler. | |
| 2,808,058 | 10/1957 | Halstead | 131—21 |
| 2,936,802 | 5/1960 | Skoog. | |
| 2,945,498 | 7/1960 | Valdespino | 131—21 |
| 3,033,210 | 5/1962 | Clausen et al. | 131—42 X |

SAMUEL KOREN, *Primary Examiner.*

HAROLD DEELEY, *Examiner.*